(12) United States Patent
Skelly et al.

(10) Patent No.: US 6,657,158 B1
(45) Date of Patent: Dec. 2, 2003

(54) METHOD OF PROCESSING A LASER SCORED INSTRUMENT PANEL WITH AN INVISIBLE SEAM AIRBAG OPENING

(75) Inventors: Jon M. Skelly, Ann Arbor, MI (US); Robert C. Bondar, Grosse Ile, MI (US); Frederick J. Hornburg, Woodhaven, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/161,456

(22) Filed: Jun. 3, 2002

(51) Int. Cl.7 .............................................. B23K 26/00
(52) U.S. Cl. .............................. 219/121.71; 219/121.7; 219/121.85
(58) Field of Search ...................... 219/121.71, 121.7, 219/121.85, 121.68, 121.69, 121.67

(56) References Cited

U.S. PATENT DOCUMENTS

| | | | |
|---|---|---|---|
| 5,072,967 A | 12/1991 | Batchelder et al. | |
| 5,316,822 A | 5/1994 | Nishijima et al. | |
| 5,632,914 A | 5/1997 | Hagenow et al. | |
| 5,744,776 A | 4/1998 | Bauer | |
| 5,783,016 A | * 7/1998 | Gallagher et al. | 156/214 |
| 5,961,143 A | 10/1999 | Hlywka et al. | |
| 6,070,901 A | 6/2000 | Hazell et al. | |
| 6,139,049 A | 10/2000 | Gallagher | |
| 6,210,614 B1 | * 4/2001 | Gardner, Jr. et al. | 264/46.5 |
| 6,224,090 B1 | 5/2001 | Lutze et al. | |
| 6,318,752 B1 | 11/2001 | Warnecke et al. | |
| 2002/0042235 A1 | * 4/2002 | Ueno et al. | 442/227 |

FOREIGN PATENT DOCUMENTS

EP     0927625     7/1999

* cited by examiner

*Primary Examiner*—M. Alexandra Elve
(74) *Attorney, Agent, or Firm*—Brinks, Hofer, Gilson & Lione

(57) ABSTRACT

A process for forming an instrument panel or other motor vehicle interior trim component having a laser scored invisible deployment restraint system opening. Processing of such components having foam material layers often produces compression forces in the foam. Heat ageing of the foam causes the compression set to be relieved, which causes the deployment seam line to become visible. In this invention the part is heated prior to laser scoring to relieve compression forces within the foam layer prior to laser scoring.

20 Claims, 3 Drawing Sheets

US 6,657,158 B1

METHOD OF PROCESSING A LASER SCORED INSTRUMENT PANEL WITH AN INVISIBLE SEAM AIRBAG OPENING

FIELD OF THE INVENTION

This invention relates to a process for forming an automotive interior trim component and particularly for such a component which has been subjected to a laser scoring process.

BACKGROUND OF THE INVENTION

Multi-layer instrument panels for automobiles that incorporate an invisible seam airbag opening often utilize laser scoring to weaken the airbag opening to allow for deployment. During manufacturing, the laser cuts a continuous or perforated scoring pattern in the substrate through the underside ("B" surface) of the panel. In a trilaminate panel, the beam generally cuts through the substrate layer, foam layer, and then partially into the top skin layer which forms the visible ("A" side) of the panel. This system produces a weakened opening for a deployable restraint system in vehicles which is intended to be invisible on the "A" surface. One drawback of present production parts is that during heat ageing (as is seen in motor vehicles during natural life cycles or through validation heat cycling tests), the laser score line becomes visible on the top "A" surface as an indented groove or "witness mark" along the score line contour. Conventional wisdom indicates this is caused by the destruction of the underlying foam layer (via the laser) and the inability of the void to support the top skin layer during heating.

BRIEF SUMMARY OF THE INVENTION

This invention utilizes a pre-heat ageing method step to prevent the appearance of the witness mark on the "A" surface after laser scoring. By heat ageing the panel briefly before laser scoring, the appearance of the line on the "A" surface after laser scoring is reduced or completely eliminated.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE INVENTION

Figure 1:
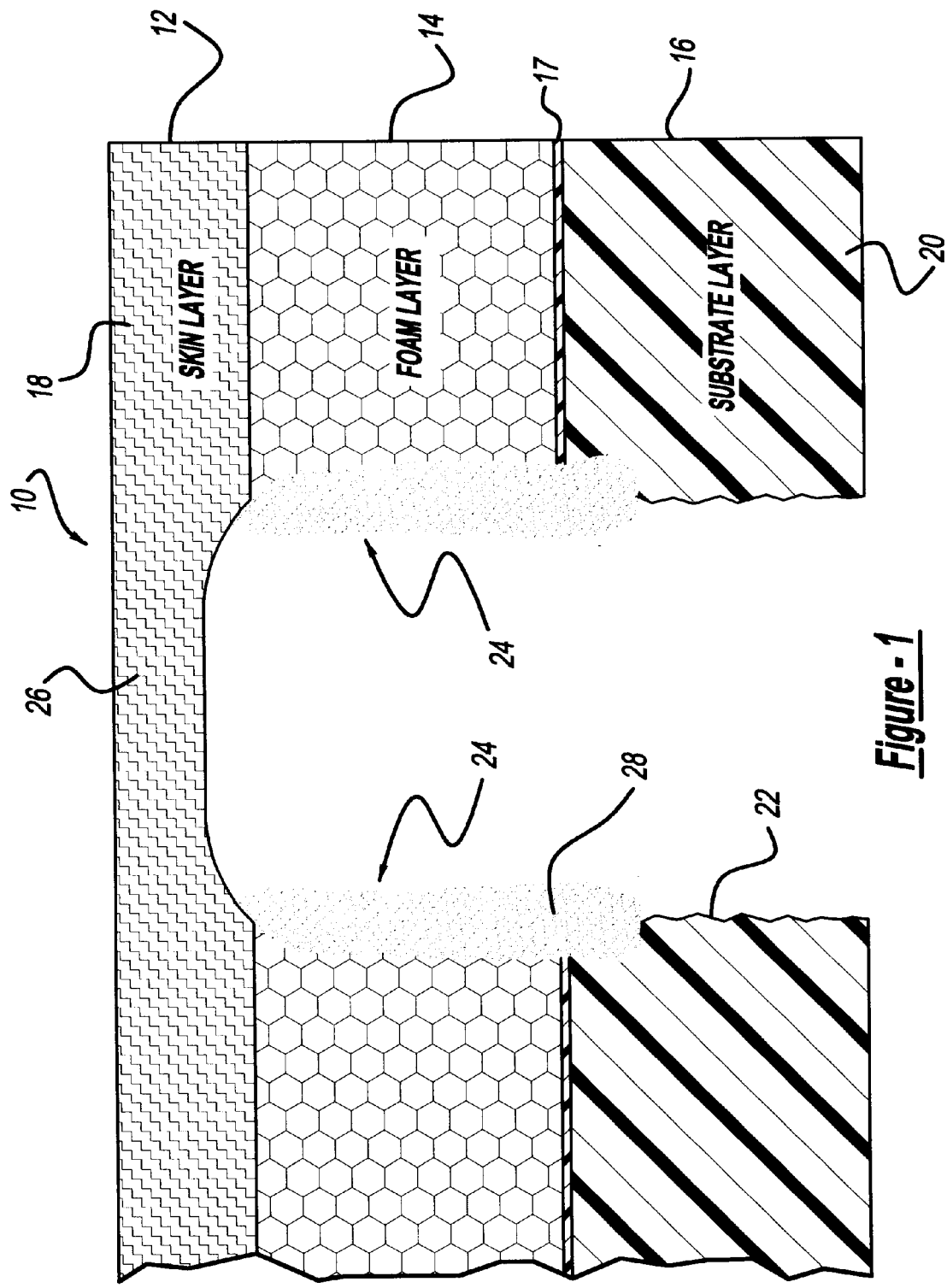
FIG. 1 is a cross-sectional view of an example trilaminate instrument panel material having a laser scored groove.

FIG. 1 illustrates a cross-sectional view of an example motor vehicle instrument panel 10 formed of a trilaminate configuration. The instrument panel 10 includes a top skin layer 12, foam layer 14, and substrate layer 16. An additional interlayer 17 may also be provided between layers 14 and 16. This composite structure forms what is known in the industry as an "A" surface 18 which is exposed toward the interior of the associated motor vehicle, and the backside or "B" surface 20. Various processes for the forming of instrument panel 10 may be provided. For example, instrument panel 10 can be a laminate injection molded composite in which layers 12, 14 and 17 are melt bonded on a substrate 16 made of a hard or rigid material. During the laminate injection molded composite process, the foam layer 14 undergoes a compression set, due to the heat and pressure from injecting the material forming substrate layer 16 behind the trilaminate (layers 12, 14 and 17). This same compression set of the foam layer 14 is also created during the manufacturing of other trilaminate and bilaminate manufacturing process as well as other thermal forming processes. This compression set is released during heat ageing of instrument panel 10 as the foam layer 14 expands back toward its original thickness. Such heat aging occurs during normal exposure of instrument panel 10 to thermal cycles during its normal use in a motor vehicle, or during thermal cycling testing of the instrument panel. This tendency of relief of compression set causes the previously noted witness lines to appear on the instrument "A" surface 18.

FIG. 1 further illustrates a laser score groove 22. Laser scoring involves the use of a controlled laser light beam which is directed against the "B" surface 20 and destroys the substrate and foam layer 14 to create an opening for deployment of an associated airbag module (not shown). Laser score groove 22 weakens instrument panel 10 in a precise manner such that skin layer 12 will tear along score line 26 aligned with score groove 22. This allows interior trim components, including instrument panels, to be formed which have airbag openings which are invisible to the motor vehicle occupant (viewing "A" surface 18). However, as mentioned previously, heat ageing of instrument panel 10 in use causes a release of the compression set of foam layer 14.

The interactions between foam layer 14 and skin layer 12 differ in the area where the foam layer 14 supports skin layer 12, and where it is removed in the area of score groove 22. Laser score groove 22 imposes an impediment to the release of the compression set and the expansion of the foam of foam layer 14. Score groove 22 is formed by burning caused by the laser light which makes the inside lining of score groove 22 hard and stiff. A U-shaped channel 28 (inverted as illustrated) of melted foam 24 is developed. Melted foam layer 24 acts like a solid plastic member having structural and compression characteristics differing from that of the remaining foam forming foam layer 14. This "tube" formed by channel 28 also becomes welded to the underside of skin layer 12 which mechanically anchors skin layer 12 to the underlying substrate layer 16. When the foam of foam layer 14 begins to release its compression set and expand during subsequent heating, the "tube" of channel 28 cannot expand and therefore holds the skin layer 12 in place. This "tube" becomes an anchor for the skin layer 12 at score line 26. The surrounding foam of foam layer 14 expands, releasing its compression set while the score line 26 above score groove 22 does not. This creates a depressed groove along the laser score line 26. The groove is not, as previously believed, caused by the foam 14 compressing along the score line 26 and sinking under the weight of the skin, but rather by the expansion of the foam of foam layer 14 around the score line 26, while the skin layer 12 material along line 26 itself remains stationary. It is this new understanding of the mechanism of failure that gives rise to the method of this invention to correct the problem.

The appearance of such witness lines may also occur in irregular and unpredictable manner. Not only is the appearance of any witness line undesirable where the object is to produce an invisible airbag seam, but further such witness lines may be irregular in appearance around the perimeter of the airbag opening.

Laser scoring to form score groove 22 may be accomplished by numerous processes. One such process is described by U.S. Pat. No. 5,744,776 which is hereby incorporated by reference. Laser scoring processes typically use a $CO_2$ gas laser which creates a beam focused to a point. The beam may be advanced continuously to create score groove 22 which forms an invisible seam airbag deployment opening. Alternatively, the scoring can be a series of closely spaced holes forming a score groove 22 through closely spaced perforations. In either instance, however, the disadvantage of the prior art noted previously appears.

Figure 2:
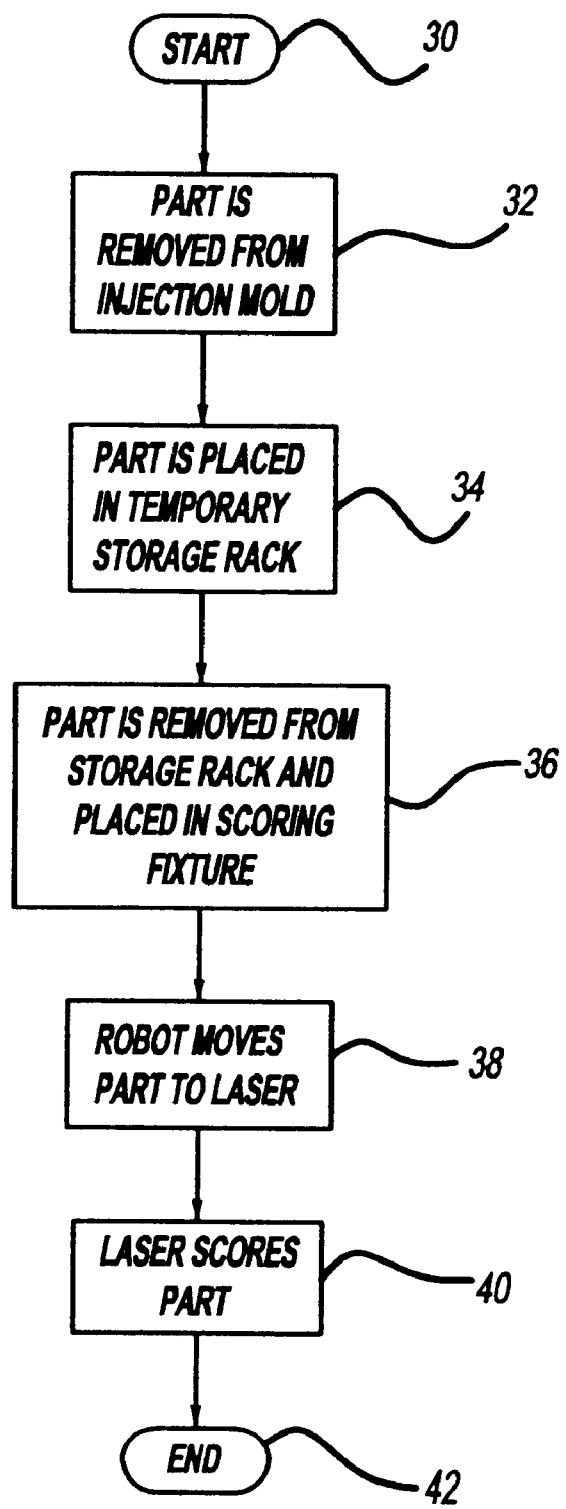
FIG. 2 is a process description flowchart in accordance with a prior art process.

Now with reference to FIG. 2, a flowchart for processing instrument panel 10 in accordance with the prior art method is illustrated. Step 30 designates the beginning of the process. The part is removed from an injection mold at step 32. This step could also include any other type of processing in which a final instrument panel 10 (or other type of panel) is produced. Thereafter, instrument panel 10 is stored for further processing at step 34. Next, the instrument panel 10 is loaded into a laser scoring fixture at step 36. Parts handling equipment next moves instrument panel 10 to a laser scoring station at step 38. Laser scoring through any one of a number of potential process as described previously occurs at step 40, yielding a scored instrument panel 10 at step 42.

Figure 3:
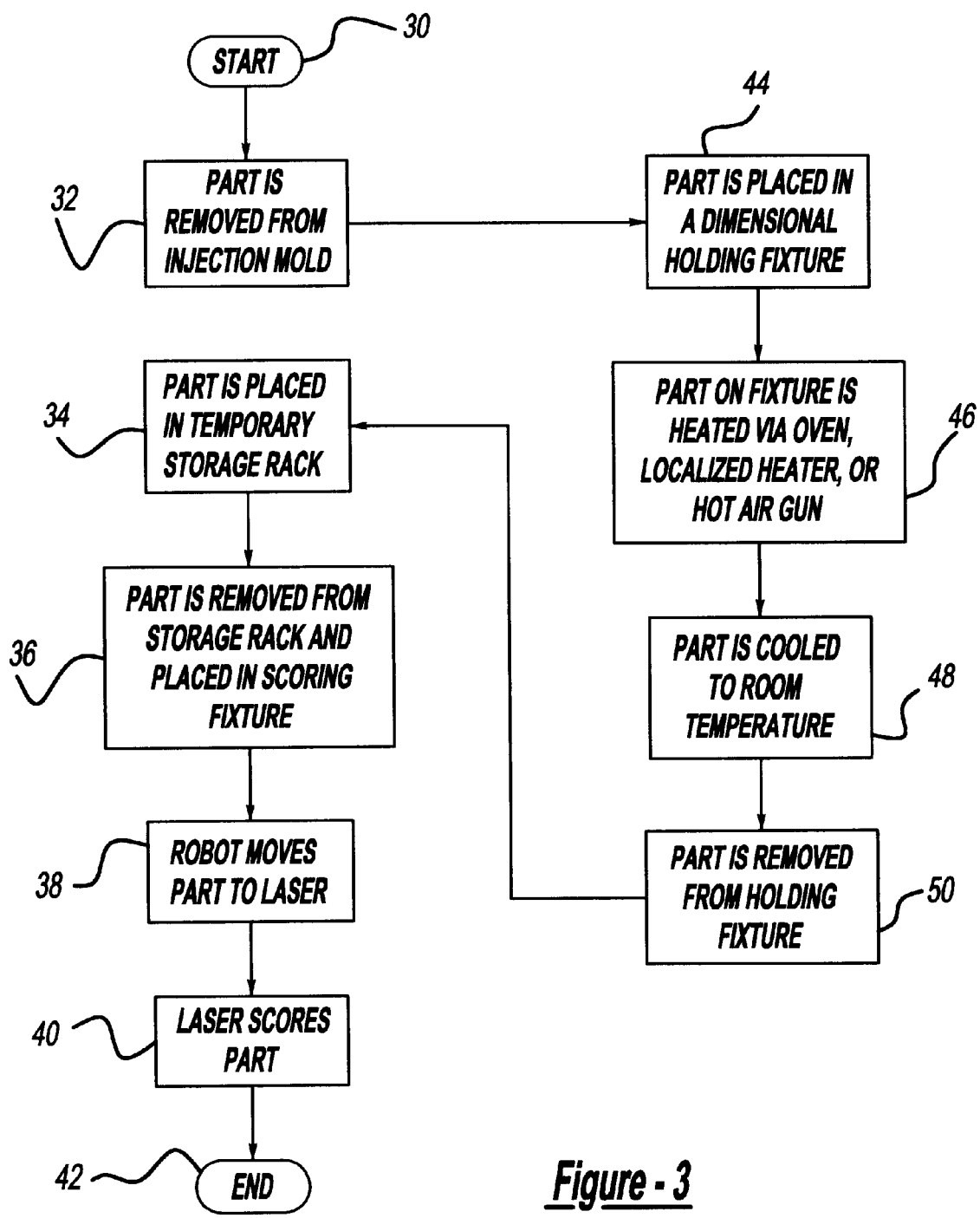
FIG. 3 is a process description flowchart of a method in accordance with the present invention.

Now with reference to FIG. 3, a process in accordance with the present invention is illustrated. In this invention the instrument panel 10 is preheated to release the foam compression set prior to the laser scoring step. This is illustrated in the additional steps 44 through 50 shown in FIG. 3. Those steps which are common between FIGS. 2 and 3 are identified by like reference numbers.

After the instrument panel 10 is removed from mold at step 32 it is transferred to a dimensional holding fixture at step 44. This holding fixture is designed to maintain the dimensional integrity of instrument panel 10 during further processing steps will now be described. Once fastened the holding fixture at step 44 instrument panel 10 is moved into an oven or another station where it is heated at step 46. As stated previously, this heating is designed to release internal compression set forces within foam layer 14 acting on the instrument panel 10 structure. Thereafter, the part is cooled to room temperature at step 48 and is finally removed from the holding fixture at step 50. Next, the part enters the process stream beginning at step 34 as previously described and at step 40 is laser scored.

When the instrument panel 10 has finally been scored at step 40, the foam layer 14 has already expanded to its maximum thickness. Further heat aged testing does not produce a previously mentioned "groove" or witness line because foam 14 no longer expands.

As an example of implementation of the process of this invention, a Visteon Laminate Injection Molded (VLIM) instrument panel 10, such as that seen on the Mazda Tribute (J14) vehicle is used in this example. In this case, the instrument panel design includes a seamless airbag opening on the passenger side. The trilaminate skin is a thermoplastic olefin (TPO) skin layer 12, an olefinic foam middle layer 14, with a polypropylene based interlayer 17. The substrate layer 16 is a talc filled polypropylene such as ATX 832 produced by ATC, Inc., which is commercially available. The instrument panel 10 is placed in a heating oven at 230° F. for 30 minutes, prior to laser scoring. The part is then allowed to cool to room temperature before laser scoring the airbag door opening. The part is then used in the usual fashion for production.

Various alternatives can be implemented in accordance with the present invention. For example, various other heating times have been experimented with. It was found that 15 minute exposure at 250° F. in step 46 also produced the desired result for the previous mentioned material system comprising instrument panel 10. Alternate methods of heating may also be implemented, for example, a portable heating element to locally heat the airbag opening area of instrument panel 10 or a heating bank used directly after molding at step 32 while the parts are on a fixture as may be required. In any event, the concept of this invention involves essentially the full release of compression set of the foam layer 14 prior to laser scoring. Experiments utilizing the process of this invention reveal no discernable witness lines following heat ageing cycling tests which are required by many original equipment manufacturers (OEM) customers.

In addition to instrument panels, there are numerous other interior trim components of motor vehicles which conceal airbag modules. For example, side impact airbags and side curtain airbag systems may be mounted to motor vehicle seats, door trim panels, headliners or various pillar structures of the motor vehicle interior compartment. For many of these applications, it is desirable to conceal the deployable restraint system and such concealment may be provided by laser scoring. Accordingly, this invention may also be implemented in connection with interior trim components in addition to instrument panels. The invention is believed best adapted for such applications where compression set forces act on the surface forming the panel's "A" surface.

While the above description constitutes the preferred embodiment of the present invention, it will be appreciated that the invention is susceptible to modification, variation and change without departing from the proper scope and fair meaning of the accompanying claims.

What is claimed is:

1. A method of processing an automotive interior trim component of the type forming an opening for a deployable restraint system comprising the steps of:

forming the interior trim component of multiple layers including a foam layer, the interior trim component defining an A surface and a B surface, heating the interior trim component following the forming step at a temperature and time to substantially relieve compression set of the foam layer at least in the region of the opening, cooling the interior trim component to about room temperature following the heating step, and scoring the interior trim component following the cooling step using a laser to score the foam layer such that the scoring is not visible on the A surface.

2. A method of processing an automotive instrument panel of the type forming an invisible seam opening for a deployable restraint system comprising the steps of:

forming the interior trim component of multiple layers including a skin layer forming an A surface with the foam layer underlying the skin layer, the instrument panel further defining a B surface, heating the interior trim component following the forming step at a temperature and time to substantially relieve compression set of the foam layer at least in the region of the invisible seam opening, cooling the instrument panel to about room temperature following the heating step, and scoring the instrument panel following the cooling step using a laser to score through the B surface and at least a portion of the foam layer such that the scoring is not visible on the A surface.

3. A method of processing an automotive instrument panel of the type forming an invisible seam opening for a deployable restraint system comprising the steps of:

forming the interior trim component of multiple layers including a skin layer forming an A surface made of a thermoplastic olefin with a foam layer underlying the skin layer made of an olefinic foam, an interlayer directly underlying the foam layer made of a polypropylene material and a substrate layer directly underlying the interlayer made of a polypropylene material and defining a B surface, heating the interior trim component following the forming step at a temperature and time to substantially relieve compression set of the foam layer at least in the region of the invisible seam opening, cooling the instrument panel to about room temperature following the heating step, and scoring the instrument panel following the cooling step using a laser to score through the B surface and at least a portion of the foam layer such that the scoring is not visible on the A surface.

4. The method of claim 1 wherein the forming step further comprises the interior trim component having a skin layer forming the A surface, the foam layer directly underlying the skin layer.

5. The method of claim 1 wherein the forming step further comprises the interior trim component further having a substrate layer directly underlying the foam layer and forming the B surface.

6. The method of claim 1 wherein the automotive trim panel is an instrument panel.

7. The method of claim 1 wherein the forming step further comprises the interior trim component formed of a laminate injection molded composite.

8. The method of claim 1 wherein the forming step further comprises the interior trim component having a skin layer forming the A surface made of a thermoplastic olefin, the foam layer directly underlying the top skin layer made of an olefinic foam, an interlayer directly underlying the foam layer made of a polypropylene material and a substrate layer directly underlying the interlayer and forming the B surface and made of a polypropylene material.

9. The method of claim 1 wherein the heating step further comprises placing the interior trim component in an oven for a period of about 30 minutes.

10. The method of claim 1 wherein the heating step further comprises placing the interior trim component in an oven at a temperature of about 250° F.

11. The method of claim 1 wherein the heating step further comprises placing the interior trim component in an oven for a period of about 30 minutes at a temperature of about 250° F.

12. The method of claim 2 wherein the forming step further comprises the interior trim component further having a substrate layer directly underlying the foam layer and forming the B surface.

13. The method of claim 2 wherein the forming step further comprises the instrument panel formed of a laminate injection molded composite.

14. The method of claim 2 wherein the forming step further comprises the instrument panel having the skin layer made of a thermoplastic olefin, the foam layer directly underlying the top skin layer made of an olefinic foam, an interlayer directly underlying the foam layer made of a polypropylene material and a substrate layer directly underlying the interlayer and forming the B surface and made of a polypropylene material.

15. The method of claim 2 wherein the heating step further comprises placing the instrument panel in an oven for a period of about 30 minutes.

16. The method of claim 2 wherein the heating step further comprises placing the instrument panel in an oven at a temperature of about 250° F.

17. The method of claim 2 wherein the heating step further comprises placing the instrument panel in an oven for a period of about 30 minutes at a temperature of about 250° F.

18. The method of claim 3 wherein the heating step further comprises placing the instrument panel in an oven for a period of about 30 minutes.

19. The method of claim 3 wherein the heating step further comprises placing the instrument panel in an oven at a temperature of about 250° F.

20. The method of claim 3 wherein the heating step further comprises placing the instrument panel in an oven for a period of about 30 minutes at a temperature of about 250° F.

* * * * *

UNITED STATES PATENT AND TRADEMARK OFFICE
CERTIFICATE OF CORRECTION

PATENT NO.   : 6,657,158 B1  
DATED        : December 2, 2003  
INVENTOR(S)  : Jon M. Skelly, Robert C. Bondar and Frederick J. Hornburg It is certified that error appears in the above-identified patent and that said Letters Patent is hereby corrected as shown below:

<u>Title page,</u>
Item [75], Inventors, "Hornburg" should read -- Homburg, Jr. --.

Signed and Sealed this

Sixteenth Day of March, 2004

JON W. DUDAS
*Acting Director of the United States Patent and Trademark Office*